V. H. VAN SANT.
AIR INLET DEVICE.
APPLICATION FILED APR. 6, 1921.
1,407,049.
Patented Feb. 21, 1922.
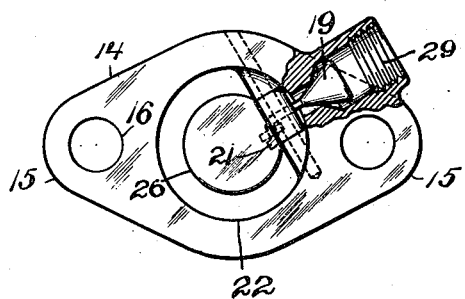
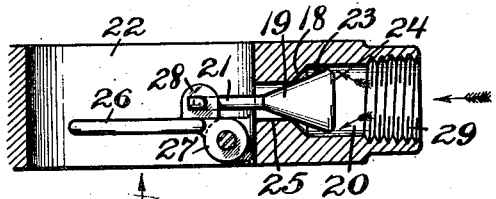
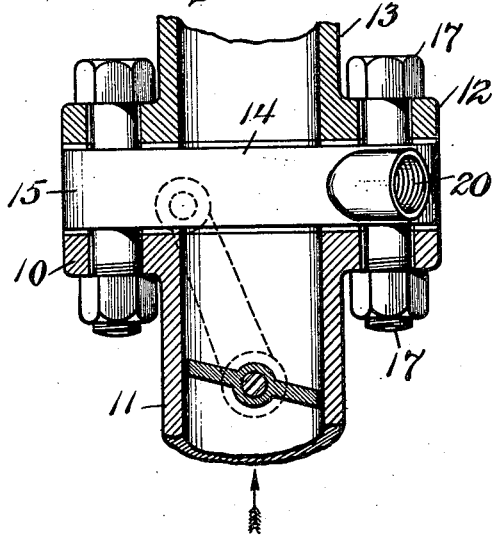
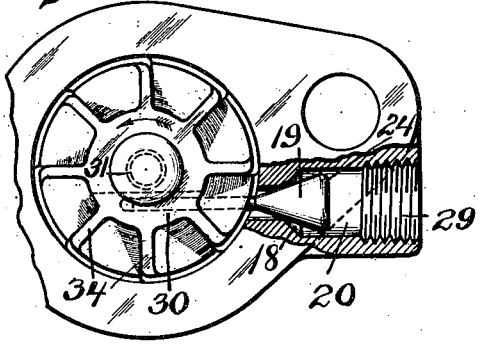
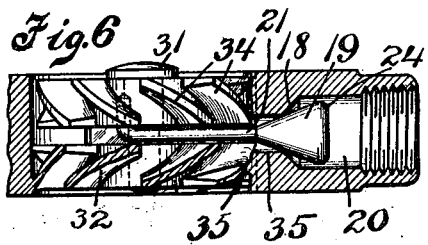
Inventor:—
Victor H. Van Sant.
BY
Wm H Caufield
Attorney.

UNITED STATES PATENT OFFICE.

VICTOR H. VAN SANT, OF NEWARK, NEW JERSEY.

AIR-INLET DEVICE.

1,407,049.        Specification of Letters Patent.   Patented Feb. 21, 1922.

Application filed April 6, 1921. Serial No. 458,951.

*To all whom it may concern:*

Be it known that I, VICTOR H. VAN SANT, a citizen of the United States, and a resident of Newark, county of Essex, and State of New Jersey, have invented certain new and useful Improvements in Air-Inlet Devices, of which the following is a specification.

This invention relates to an improved air inlet device or auxiliary valve of a type which admits air to a pipe or conductor carrying a fluid and automatically governs the amount of air admitted proportionate to the velocity of the fluid passing through the main pipe.

In order to make the description of my invention clear it is described as applied to the fuel intake of an internal combustion engine, as this is the place for which it was primarily designed, but it is, of course, applicable to any situation where it can be used to advantage. The description herein being directed toward its use in connection with an internal combustion engine, it will be described as applied preferably at a point between the carburetor outlet flange and the intake manifold flange where the carbureted mixture of gas and air is passing to the engine.

It is well known that the flow of a liquid body through an orifice accelerates more rapidly with increasing pressure or suction than the flow of air under the same conditions, hence with the conventional carburetion system as applied to internal combustion motors, using hydrocarbon liquids as fuel, the resultant mixture of gas and air becomes increasingly rich as the speed of the motor increases, causing imperfect combustion of the charge, carbonization of motor parts and a waste of fuel.

The invention is designed to provide a device which is not dependent upon springs or gravity for opening of the auxiliary valve, but relies solely upon two essential factors, one, the atmospheric pressure, which is a relative constant acting upon the piston surface of the valve against a partial vacuum created in the intake by the motor suction, and the other factor is a variable pressure exerted upon its actuating element by the fluid passing through the main conductor, counter-acting the atmospheric pressure on the valve and tending to open it outward off the valve seat. The amount of opening of the auxiliary valve is proportionate to the motor speed as the butterfly throttle in the carburetor is opened and closed, and since the infiltration of air through the auxiliary valve tends to cause a drop in the suction on the fuel jet of the carburetor and to thin the carbureted mixture, a perfect mixture of gas and air is maintained at all speeds. The shape of the valve and its actuating elements are factors which confer successful operation on the device.

The invention is illustrated in the accompanying drawing, in which Figure 1 is a bottom view of one form of my new device, and Figure 2 is a cross-section showing the valve in elevation. Figure 3 is a perspective view of a flap for operating the valve. Figure 4 is a side view of the device shown in Figure 1, this view illustrating how it is inserted in the main pipe. Figure 5 is a top view, and Figure 6 a section of a modified form of construction.

The device can be incorporated as part of a carburetor or of an intake manifold, but it is preferably made as a unitary structure that can be inserted between the flange 10 of the pipe 11, leading from the carburetor, and the flange 12 of the pipe 13 of the intake manifold of the engine, and has a substantially flat casing 14 having ears 15 to fit the shape of the flanges 10 and 12, and having holes 16 to receive the bolts 17, by means of which the parts are held together.

The valve seat 18 is normally closed by the valve 19 which extends into the inlet passage and has a stem 21 extending into the main opening 22. The valve 12 is cone-shaped with the tapered part 23 opposite the valve seat and the base 24 facing outwardly within the inlet port, the largest diameter of the valve being smaller than the inlet port and usually proportioned so that the amount of air that can pass around the valve is equal to the amount that passes between the reduced part 25 of the inlet port and the valve stem 21. One form of actuating means for the valve includes a flap 26 with a knuckle 27, by means of which it is hinged, the flap also having an eye 28 through which the stem 21 is passed so as to connect the valve with the flap.

When the engine is started, a partial vacuum is created in the fuel intake and the velocity of the fluid passing through the intake is not high enough to exert sufficient pressure on the flap 26 to overcome the counter-acting atmospheric pressure acting upon the piston surface 24 of the valve 19 and tending to hold it shut. When the engine speed is increased by opening the carburetor throttle a greater volume of fluid is passed through the intake passage with a proportionate increase in velocity, causing the flap 26 to be forced inward, thus forcing the valve 19 open to admit air which rushes in through the inlet port. As the speed increases the auxiliary valve is forced still further away from the valve seat 18 and a proportionate increase of air is accomplished. On a reduction of velocity in fuel passage when the throttle is closed the atmospheric pressure acting on the piston surface 24 of the valve 19 tends to force it closed.

The inlet port can be threaded, as at 29, to permit a pipe to be secured thereto if heated air from around the exhaust pipe is to be conducted to the inlet port 20. In the modified form shown in Figures 5 and 6, the flap is replaced by a rotor 30, which has its rotation limited by reason of its attachment to the valve stem 21 of the auxiliary valve. The rotor is mounted on a central stud 31 and fits freely thereon, the stud projecting from the stator 32, the vanes 33 of which direct the mixture against the vanes 34 of the rotor. In this device the means for actuating the valve has an additional function in that it causes a complete mixture of the incoming air and that passing through the pipe, as the inlet port has its inner end 35 under the vanes of the rotor and the air passing is whirled around with the mixture already in, and a complete initial mingling of the mixture and air is accomplished.

The form of valve used in this device makes the use of any springs unnecessary, since with fluid of slow velocity passing through the main pipe the force is insufficient to move the flap and to force the valve open against the suction of the motor. It will be evident that increased velocity will cause the valve to be opened.

Heretofore valves have been made with various mechanical yielding means for holding the valve in its closed position, such as adjustable springs, and weights have also been used for this purpose. These, however, are subject to variation, due sometimes to minor causes, such as differences in the temper of springs or other factors affecting their strength, whereas in this construction a valve which is devoid of such mechanical resisting means, and is held shut by the pressure of the atmosphere, is much more consistent in its operation, requires no adjustment and produces a better result.

I claim:

1. A device of the kind described comprising a casing with a main opening and an air inlet having a valve seat, an element in the main opening adapted to be operated by fluid passing through the opening, a freely movable valve in the inlet, said valve being of conical shape tapering toward the valve seat and having a piston area on its large diameter slightly under the large area of the air inlet, and a stem connecting the element and the valve.

2. A device of the kind described comprising a casing with a main opening and a transverse air inlet passage, having a shoulder therein to form a valve seat, a cone-shaped valve with a flat outer face freely movable in the inlet, a valve stem projecting inwardly from the valve, and a flap hinged in the main opening and secured to the valve stem, whereby the valve when closed causes the flap to impart its maximum restriction to the main opening.

3. A device of the character described comprising a fuel passage, a transversely disposed air inlet, a valve seating inward in said air inlet and freely movable therein, an element disposed within the fuel passage and adapted to actuate the valve against the motor suction, and a valve stem connecting the element with the valve.

4. A device of the character described comprising a casing having a main opening, a communicating air inlet passage, a valve seat within said air inlet passage, a freely operable valve seating on said valve seat, a valve stem connecting said valve with an actuating element disposed within the main opening and adapted to be operated by a fluid passing through the main opening to open said valve against atmospheric pressure only when a partial vacuum has been created within the main opening.

5. A device of the kind described comprising a casing with a main opening and an air inlet, an element in the main opening adapted to be operated by fluid passing through the opening, a valve in the inlet, a connection between the element and the valve, the valve being disposed so that only the constant pressure of the atmosphere acting against a partial vacuum in the main opening yieldingly resists the movement of the valve toward opening, which opening movement is caused by the passage of the fluid within the main opening.

6. A device of the kind described comprising a casing having a main opening adapted to coincide with the fuel intake passage of an internal combustion motor, a transversely disposed inlet port having an enlarged outer diameter and a shoulder to form a valve seat, a valve having a tapered metering end projecting into the valve seat, and a relatively large piston surface on its outer end having a clearance in the large diameter of the inlet port approximating the capacity of the smaller port through the valve seat, a valve stem integral with the valve and extending into the main opening, an element within the main opening connecting with the valve stem and disposed to be actuated by the passage of incoming fuel mixture to open the valve against the suction of the motor, the outer end of the valve being free.

7. A device of the character described comprising a casing having a fuel intake passage adapted to carry fluids below atmospheric pressure and having a transversely disposed communicating air inlet forming a valve chamber, a conical-shaped valve seating in said valve chamber and having its taper extending into the valve seat, a valve stem extending from the small end of the valve into the fuel intake passage, and an oscillating element pivoted in the fuel intake and forming a connection with the valve stem and adapted to force the valve outwardly off the valve seat against only atmospheric pressure when oscillated against the valve stem, such oscillation being produced by the fluid impinging upon the element.

8. A device of the character described comprising a casing having a main passage adapted to carry fluids under a partial vacuum and having a transverse communicating air inlet forming an open-ended valve chamber, a shoulder within said valve chamber forming a valve seat, a valve seating inwardly upon the valve seat and disposed to present a piston surface to resist atmospheric pressure tending to force the valve closed, there being a clearance between the piston surface of the valve and the wall of the valve chamber permitting a leakage of air to pass into the main passage when said valve is raised off the valve seat, a valve stem extending from the valve into the main passage, and an oscillating element pivoted within the main passage connecting with the valve stem and adapted to raise the valve off the valve seat when actuated by the fluid passing through the main opening.

In testimony that I claim the foregoing, I have hereto set my hand, this 5th day of April, 1921.

V. H. VAN SANT.